(12) United States Patent
Woodford

(10) Patent No.: US 7,716,910 B2
(45) Date of Patent: May 18, 2010

(54) POWERED ROTOR FOR ASSISTING CROP PICKUP FOR A BALER

(76) Inventor: Eric T. Woodford, 31230 Noble Ave., Redwood Falls, MN (US) 56283

( * ) Notice: Subject to any disclaimer, the term of this patent is extended or adjusted under 35 U.S.C. 154(b) by 445 days.

(21) Appl. No.: 11/739,194

(22) Filed: Apr. 24, 2007

(65) Prior Publication Data
US 2008/0264028 A1    Oct. 30, 2008

(51) Int. Cl.
A01D 43/02    (2006.01)
(52) U.S. Cl. .............................. 56/364; 56/190; 56/341
(58) Field of Classification Search ................... 56/190, 56/340, 364, 192, 341
See application file for complete search history.

(56) References Cited

U.S. PATENT DOCUMENTS

| | | | |
|---|---|---|---|
| 1,819,432 A * | 8/1931 | Mickle | 56/364 |
| 2,524,233 A * | 10/1950 | Russell | 56/364 |
| 4,015,410 A * | 4/1977 | Smith | 56/364 |
| 4,304,090 A * | 12/1981 | Gavrilenko et al. | 56/364 |
| 4,411,127 A | 10/1983 | Diederich | |
| 4,430,847 A * | 2/1984 | Tourdot et al. | 56/10.7 |
| 4,495,756 A | 1/1985 | Greiner | |
| 4,766,717 A * | 8/1988 | Thomann | 56/341 |
| 4,910,940 A | 3/1990 | Grady | |
| 4,955,188 A * | 9/1990 | von Allworden | 56/341 |
| 5,293,732 A | 3/1994 | Vogelgesang | |
| 5,519,990 A | 5/1996 | Rodewald | |
| 5,848,523 A | 12/1998 | Engel et al. | |
| 6,012,271 A | 1/2000 | Wilkens | |
| 6,116,002 A | 9/2000 | Roth | |
| 6,295,797 B1 | 10/2001 | Naaktgeboren | |
| 6,370,856 B1 | 4/2002 | Engel | |
| 6,526,736 B1 | 3/2003 | Anstey | |
| 6,581,364 B2 | 6/2003 | Lucand | |
| 6,601,375 B1 | 8/2003 | Grahl | |
| 6,644,006 B1 | 11/2003 | Merritt | |
| 6,651,418 B1 | 11/2003 | McClure | |

(Continued)

FOREIGN PATENT DOCUMENTS

DE    202005020779    11/2006

(Continued)

OTHER PUBLICATIONS 5 sheets showing a Case IH LBX422 big baler—from PROFI and Farm Machinery magazine dated Sep. 9, 2006—No. 9.

Primary Examiner—Alicia M Torres
(74) Attorney, Agent, or Firm—Sturm & Fix LLP

(57) ABSTRACT

A method and apparatus for baling crop materials using a baler with a pickup thereon for picking up crop materials from the ground and moving such crop materials towards a baling chamber. The pickup has a pickup frame operatively attached to the baler, the frame having a plurality of laterally spaced apart tines of a type which is typical for balers. A powered rotor is rotationally attached to the baler a predetermined distance above and forwardly of the pickup frame, the rotor being powered to rotate in at least one direction. A plurality of blade assemblies are disposed on the rotor having blades extending radially outwardly from the axis of the rotor wherein at least at times one or more of the blade assemblies are disposed between one or more of the tines.

35 Claims, 10 Drawing Sheets

U.S. PATENT DOCUMENTS

| | | | |
|---|---|---|---|
| 6,679,041 B2 | 1/2004 | Viaud | |
| 6,688,092 B2 | 2/2004 | Anstey | |
| 6,769,239 B1 | 8/2004 | Webb | |
| 6,810,650 B2 | 11/2004 | McClure | |
| 6,877,304 B1 | 4/2005 | Smith | |
| 6,886,312 B1 * | 5/2005 | Inman et al. | 53/527 |
| 6,948,300 B1 | 9/2005 | Bandstra | |
| 6,962,041 B1 | 11/2005 | Taylor | |
| 7,107,748 B2 | 9/2006 | McClure | |
| 7,124,568 B2 | 10/2006 | Hotaling | |
| 7,448,196 B2 * | 11/2008 | Schrag et al. | 56/341 |
| 2002/0112617 A1 | 8/2002 | Leupe et al. | |
| 2005/0051040 A1 | 3/2005 | Wingert | |
| 2005/0091959 A1 | 5/2005 | Viaud | |
| 2006/0277888 A1 | 12/2006 | Erdmann | |
| 2009/0100814 A1 | 4/2009 | Egging | |

FOREIGN PATENT DOCUMENTS

| | | |
|---|---|---|
| EP | 0401542 | 12/1990 |
| EP | 1252813 | 10/2002 |
| EP | 1151657 | 6/2006 |
| EP | 1252814 | 6/2006 |
| EP | 1306003 | 6/2006 |
| EP | 1733609 | 12/2006 |

* cited by examiner

POWERED ROTOR FOR ASSISTING CROP PICKUP FOR A BALER

FIELD OF THE INVENTION

The present invention relates generally to agricultural equipment, and more specifically to a powered rotor for use in combination with a pickup portion of a baler or the like to increase baling capacity and prevent plugging of the input of a baler.

BACKGROUND OF THE INVENTION

Balers are used for many different crops. Most balers are used to bale hay. Hay is usually classified as any type of grass or legume, such as alfalfa, that is fed to livestock such as cows and horses.

Balers also bale straw, which is of course the part of the plant above ground that is left after grain such as wheat, oats barley or the like are harvested, for example with a combine harvester. A primary use for straw is for bedding for animals. Straw is also commonly used as mulch for gardens or the like.

A third category of crop material which is baled using a baler is a stiff stalk crop, such as corn stover including corn stalks which are typically baled after the corn is removed from the stalk, such as with a combine harvester which saves only the corn kernels or with a corn picker, which saves only the corn while it is still on a cob. It is this third category of crop material which is the most problematic to bale, primarily because of the stiff long pieces of plant stalk. Corn stalks are commonly used as feed for animals, such as cattle, or can be used as a raw material for making a bio-fuel, such as ethanol.

When baling corn stalks, the flow of material is not always a steady flow. Because the corn stalks do not fold together like hay and straw material, sometimes the corn stalks do not flow easily into the baler pickup. This causes the cornstalks to pile up in front of the pickup as the baler is towed through a field, causing a large pile of corn stalks to be pushed along in front of the baler pickup instead of evenly entering the baler. This requires the operator to stop the baler, reorganize the pile of cornstalks in front of the pickup of the baler and resume the baling operation. Additionally, these cornstalks can plug up the pickup of the baler so that the baler can no longer be used until such plug of material is removed, or at a minimum repositioned. This problem can occur numerous times during the process of baling a field and happens most often when the crop comprises cornstalks.

When the pickup of a baler becomes plugged with crop, the operator has a few options. Some operators will wait for the pickup to clear itself which is very damaging to the pickup; some will shake the pickup with a hydraulic lift, which is damaging to the pickup itself, some will increase and decrease the revolutions per minute of the controls of the baler which can damage the drive line and the tractor, and the most desperate operators will get out of their tractor and cab and try to clear the plug by hand. All of these methods take valuable time. Some of the methods cost money in repairs because they damage the equipment. And whenever the operator is out of the cab of the tractor, safety can be an issue.

Another problem with using a baler to bale a crop is that if the crop does not enter the pickup evenly, the bale will not be formed evenly, which devalues the bales produced and the negatively impacts the perception of quality of the baler itself because even, consistent bales are desired. This is especially true when the bales being made are large round bales. Also, uneven entry of the crop also causes extra stress on the baler, in particular of the pickup portion of the baler. This can cause premature wear and or premature failure of the components thereof.

The speed of baling is controlled to a great degree by how fast the operator can drive through the field and pickup the crop. Usually it is the pickup portion of the baler that is the limiting factor as to the speed that the baler can be towed during operation because once the crop is in the baling chamber the baler can usually handle a high capacity of crop. So although a faster pickup of the crop will increase the efficiency of the baler, operators soon learn the maximum speed that they can tow the baler for a particular crop under particular conditions and they will try to operate at such maximum speed whenever possible. Pushing beyond that optimum speed for such crop and conditions will typically cause plugging of the pickup. In general, the maximum baling speed for certain crops under the conditions existing at the time is proportional to the amount of crop material that enters evenly through the pickup portion of the baler. For certain crops, such as alfalfa, the more the crop "slips" in the pickup portion of the baler the more likely that there will be leaf shatter and leaf loss, decreasing the value of the crop. So to the extent that a pickup of a baler can be made to minimize this slippage of the crop with respect to the pickup, it will be more efficient and more of a valuable feature of such a baler.

Accordingly, there is a need for a baler apparatus that overcomes the aforementioned problems with the pickup portion of balers for baling crop materials. Because existing prior art pickup systems have built in limitations as to how quickly an even flow of the crop can be moved from the ground to the baling chamber, it is desired to overcome those limitations to create a more efficient baler by creating an even flow of crop materials through the pickup portion to the baling chamber from the instant the crop materials first enter the pickup portion of the baler and consistently maintain that flow of crop materials during the use of the baler.

SUMMARY

The present invention relates to a method and apparatus for baling crop materials using a baler with a pickup thereon for picking up crop materials from the ground and moving such crop materials towards a baling chamber. The pickup has a pickup frame operatively attached to the baler, the pickup having a plurality of laterally spaced apart tines of a type which is typical for balers. A powered rotor is rotationally attached to the baler a predetermined distance above and forwardly of a rear portion of the pickup, the rotor being powered to rotate in at least one direction. A plurality of blade assemblies are disposed on the rotor having blades extending radially outwardly from the axis of the rotor wherein at least at times one or more of the blade assemblies are disposed between one or more of the tines whereby adjacent blades which are below the axis of rotation of the rotor can be selectively moved towards the baling chamber to assist the pickup tines to move the crop materials into the baling chamber when the rotor is powered in the operative baling direction, whereby crop material will pass evenly through the pickup, minimizing the possibility of plugging of the pickup.

An object of the invention is to prevent plugging of the pickup of a baler.

Another object of the invention is to cause a positive and even flow of crop material through the pickup of a baler.

A still further object of the invention is to increase the efficiency of baling crop materials when using a baler.

Other objects, advantages and novel features of the present invention will become apparent from the following detailed

DETAILED DESCRIPTION OF THE PREFERRED EMBODIMENTS

Figure 1:
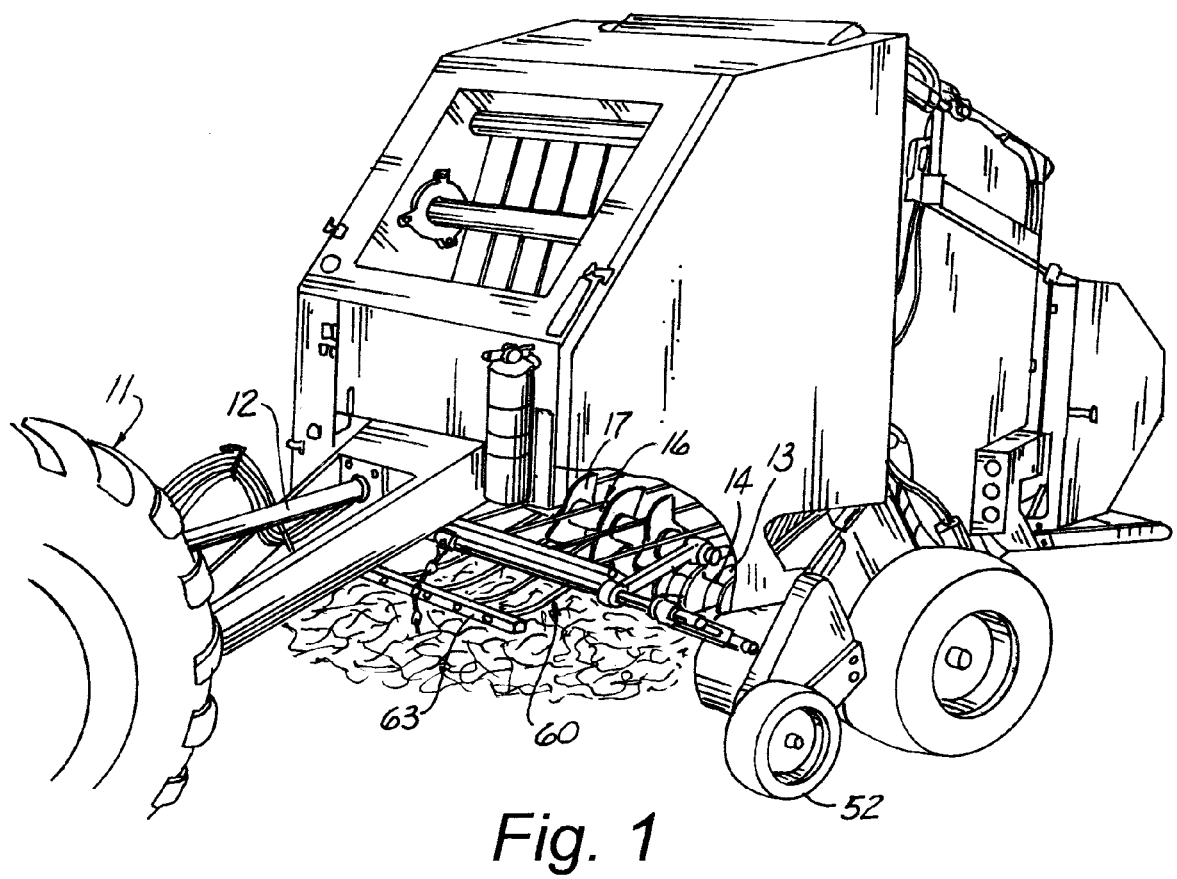
FIG. 1 is a perspective view of a baler having the present invention attached to it.

Referring now to the drawings wherein like reference numerals designate identical or similar parts throughout the several views, a preferred embodiment 1 of the present invention is illustrated in FIG. 1. The baler can, for example, be like the basic baler of U.S. Pat. No. 4,910,940 to Meyer, which is incorporated herein by reference in its entirety, though a more modern baler with more modern features can be used instead, for example the baler shown in U.S. Pat. No. 6,948,300 to Bandstra et. al, which is also incorporated herein by reference in its entirety. Of course it is to be understood that this invention can be used on any other type of baler, for example those that produce bales of a non-cylindrical shape, because the pickup sections of all prior art balers have crop material flow problems from time to time in the pickup sections thereof that could be solved by this invention.

Figure 2:
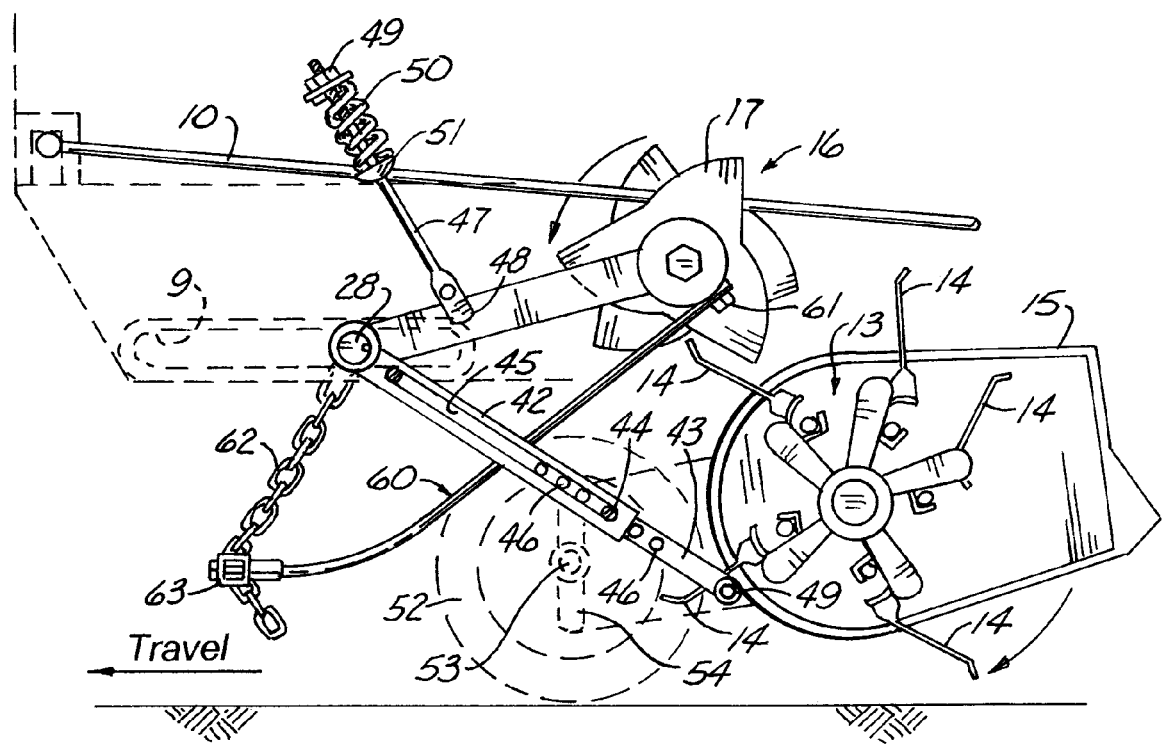
FIG. 2 is a side elevational view of the pickup portion of a baler with the rotor of the present invention attached to it in a baling position.
Figure 3:
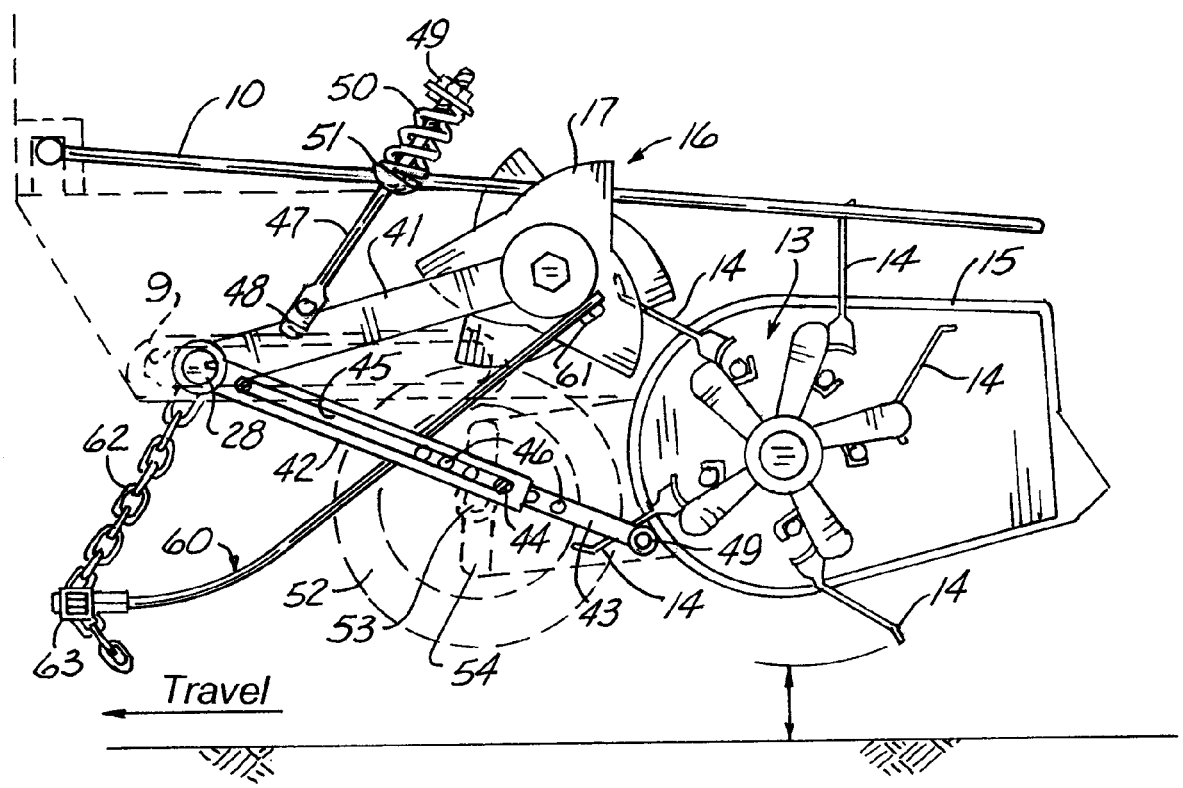
FIG. 3 is a side elevational view like FIG. 2, but with the pickup and rotor in the transport position thereof.

The baler shown in FIG. 1 is towed by a tractor 11. The tractor 11 powers the baler through a rotating power take off shaft 12 as is well known in this art. A pickup 13, shown in FIGS. 1, 2 and 3, is attached to a frame 15 has tines 14 thereon. This pickup 13 can be of a type as shown in the two patents referred to above, or any other type used on balers.

Figure 7:
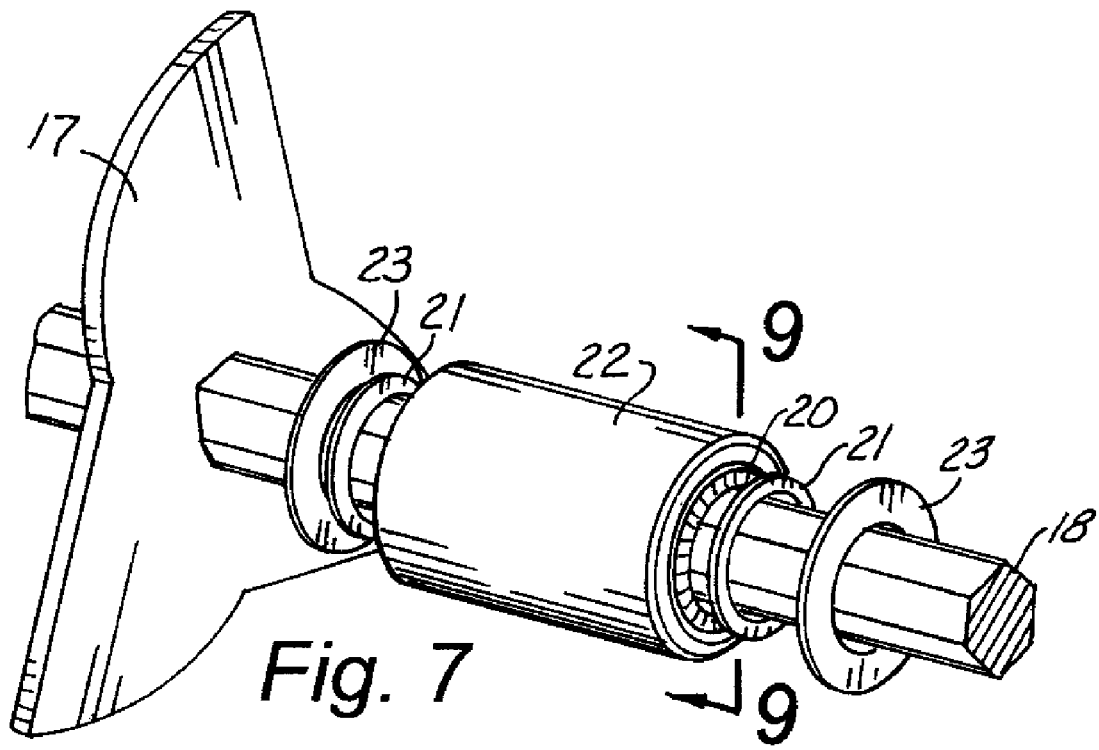
FIG. 7 is an enlarged perspective view of the of certain components of the rotor of the present invention.
Figure 8:
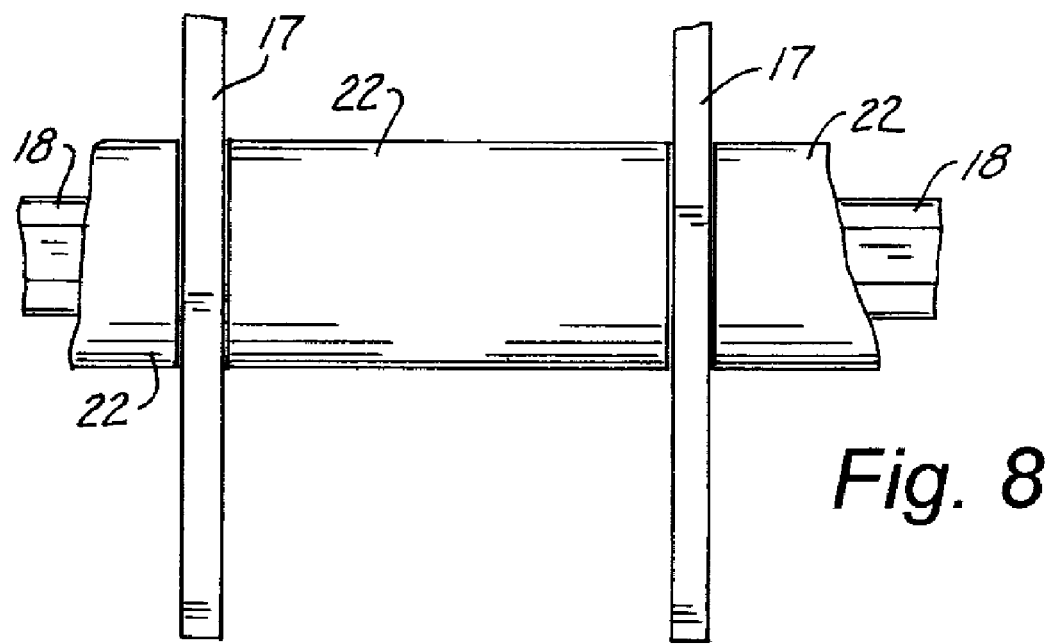
FIG. 8 is an enlarged side elevational view of a portion of the rotor shown in FIG. 7.

The rotor 16 has blades 17. The construction of the rotor 16 is constructed as shown in FIGS. 7-10. A shaft 18 having a hexagonal cross section is shown as shown in FIGS. 7 and 8, though any shaft having a non-circular cross sectional shape, could be used instead of the hexagonally shaped one 18. An opening in the center of the rotor blades 17, shown in FIG. 10, corresponds to the chosen shape and size of the cross sectional shape of the shaft 18. The rotor is formed in a modular way so that the parts shown in FIGS. 7-10 are used all of the way across the drive shaft 18.

Still looking at FIGS. 7-10, the rotor 16 includes a blade 17 having a non-circular opening 17a in a center portion thereof and projections 17b, 17c and 17d extending radially outwardly from the center portion of the blade assembly 17. In FIG. 8 a second blade 17, identical to the first one is shown. The hexagonally shaped drive shaft 18 extends through the non-circular opening 17a in both the first and second blade assemblies 17 whereby rotation of the drive shaft 18 causes rotation of the first and second blade assemblies 17 in the same direction as rotation of the drive shaft 18. At least one bearing 20 is disposed around and in contact with the driveshaft 18 at a place between the first and second blade assemblies 17, the bearing 20 having an inside race 20a with an inner diameter and an outside diameter. A first washer 21, disposed around the drive shaft 18, has the same inside and outside diameter as the inner race 20a.

Figure 8A:
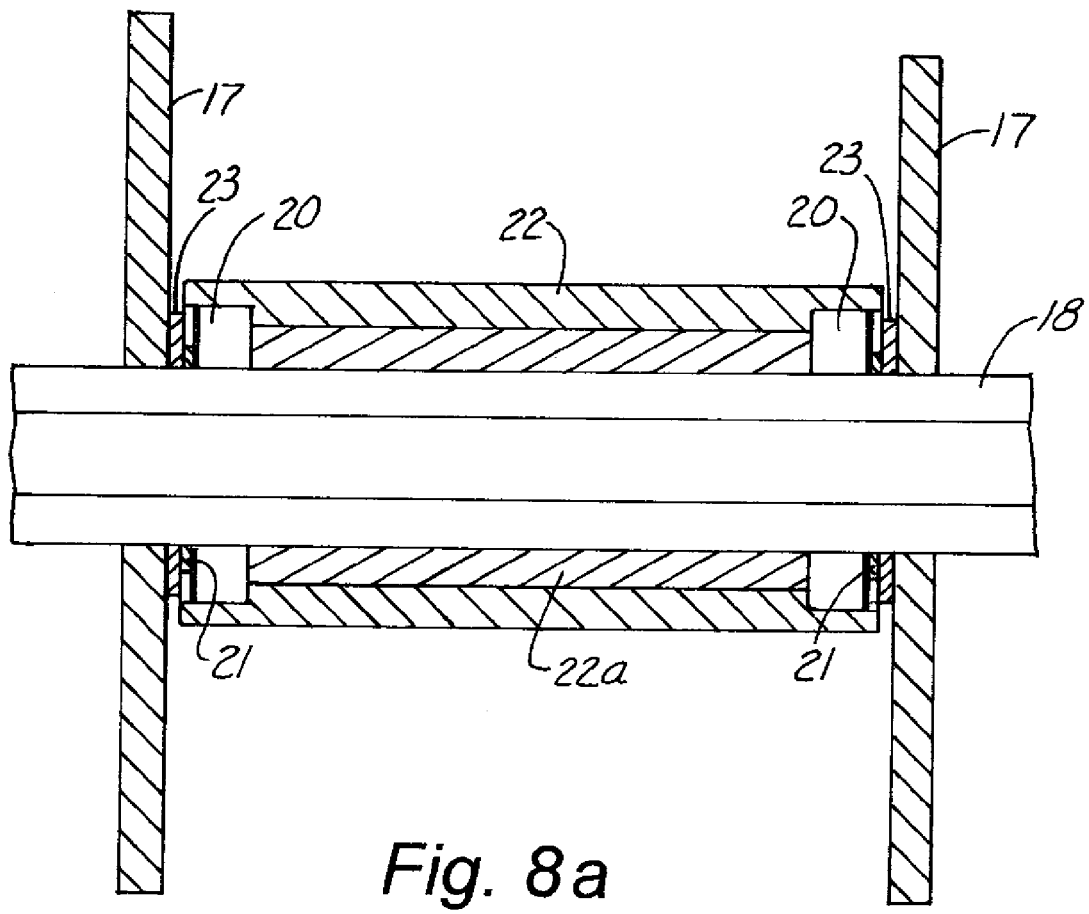
FIG. 8a is a cross sectional view through FIG. 8, except the drive shaft is not shown in cross section.
Figure 9:
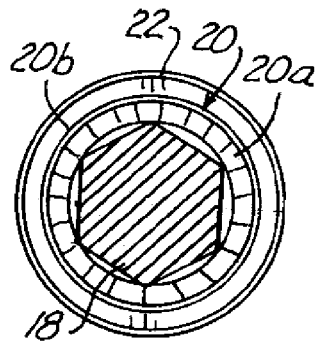
FIG. 9 is cross sectional view taken along line 9-9 of FIG. 7.
Figure 11:
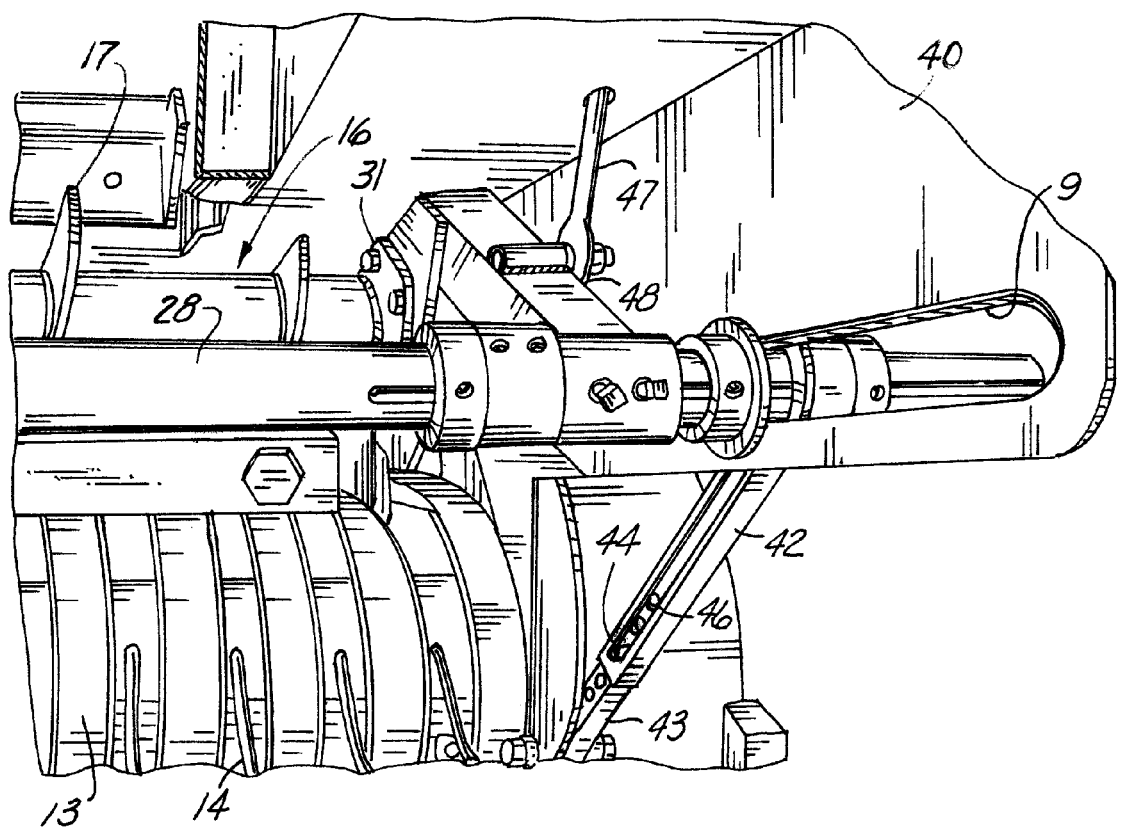
FIG. 11 is an enlarged perspective view of the of certain components of the rotor and pickup from the left front side of the baler of the present invention.

Looking now to FIGS. 8 and 8a, each bearing 20 has an outer race 20b with an inside and an outside diameter. A cylindrical housing 22 is disposed around the bearing 20 and between the first and second blade assemblies 17, the housing 22 having a predetermined inside diameter that is approximately the same as the inside diameter of the outer race 20b. The bearing 20 is in a press fit relationship with the inside of the housing 22. A second washer 23 has an outer diameter that is approximately the same as the outer diameter of the outer race 20b. Another set of bearings 20 with a spacer or race extender tube 22a inside of the cylindrical housing 22 between the bearings 20, has another set of washers 21 and 23 between the other blade assembly 17, shown in FIGS. 8 and 8a. The spacer or race extender 22a is also in a press fit relationship with the inside of cylindrical housing 22 and is of a length to hold the bearings 20, on each side thereof inside cylindrical housing 22, in a proper position, for example in the position shown in FIGS. 7 and 8a. In a preferred embodiment, the race extender 22a is an aluminum tube, but other spacers of a proper size can be made of other materials if desired. The outer diameter of the bearings 20 and the outer diameter of the race extender 22a are preferably the same so they can both be press fit inside of the cylindrical housing 20. A plurality of the subassemblies shown in FIGS. 7-9 are held in place by the clamping members 31 shown on one side in FIG. 11, a similar clamp 31 (not shown) is provided on the on the other end of rotor 16. This clamping from one side to the other side of the rotor 16 to cause all of the blade assemblies 17 and driveshaft 18 to rotate with the inner races 20a and washers 21 inside the cylindrical housings 22 while the cylindrical housings 22 remain fixed with respect to the baler. The outer washers 23 will also turn with the blades 17, inner washers 21 and the inner races 20a. This permits the center portion of the rotor 16 to be secured to one of the cylindrical members 22 such as by the members 24-28 as shown in FIG.

Figure 6:
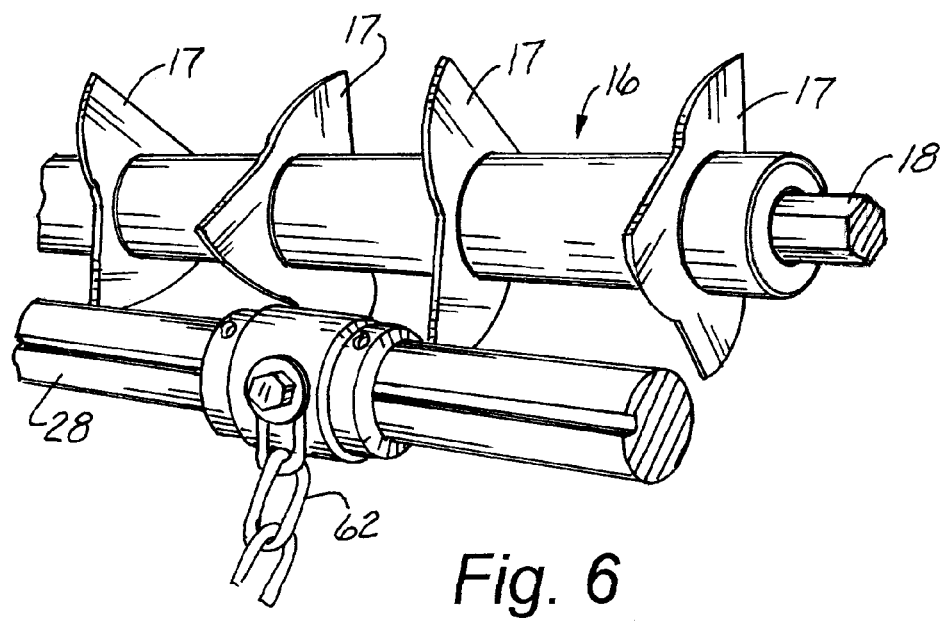
FIG. 6 is an enlarged perspective view of the powered rotor and forward wind guard of the present invention shown attached to a baler pickup.

5, which would be used if the baler is quite wide, or those stabilizing members 24-28 as shown in FIG. 6 can be eliminated if the baler is not as wide.

Figure 10:
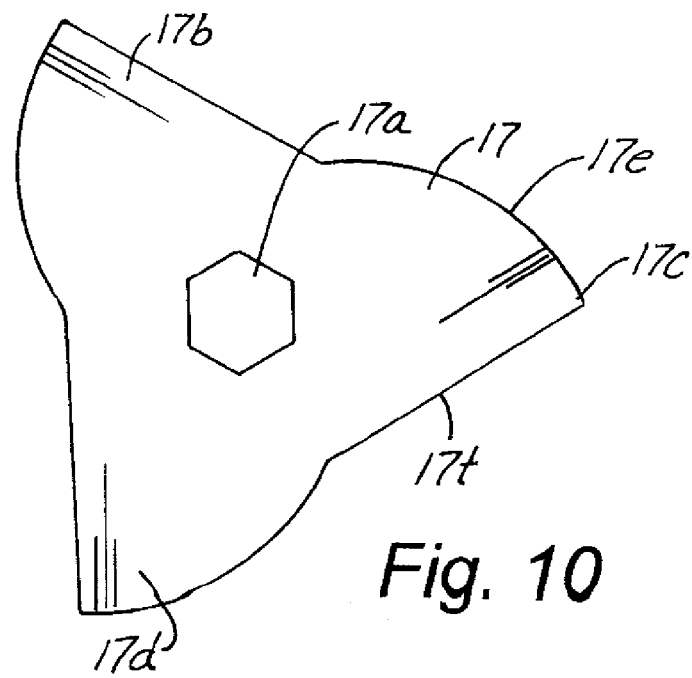
FIG. 10 is a side elevational view of one of the blade assemblies of the rotor.

FIG. 10 shows one of the blade assemblies 17 with a curved leading (front) edge 17e and a trailing edge 17t. Each of the blades 17b, 17c and 17d has a curved leading (front) edge 17f and a trailing edge 17t. Also each one of the adjacent blade assemblies 17 is staggered by 60 degrees compared to the next adjacent blade assembly 17 as can best be seen in FIGS. 2, 3, 5 and 6. This staggering is merely done by putting each blade assembly 17 onto the hexagonally shaped drive shaft 16 turned one step at a time as they are placed on the driveshaft 18. This arrangement, while not imperative, does tend to push each part of a crop component that extends between adjacent blade assemblies 17 down towards the pickup 13 in a stepped fashion rather than pushing it all down into the pickup at the exact same time. More or less blades can be used on the blade assemblies 17, for example one to ten blades could be used if desired, instead of the three shown in the preferred embodiment.

Figure 12:
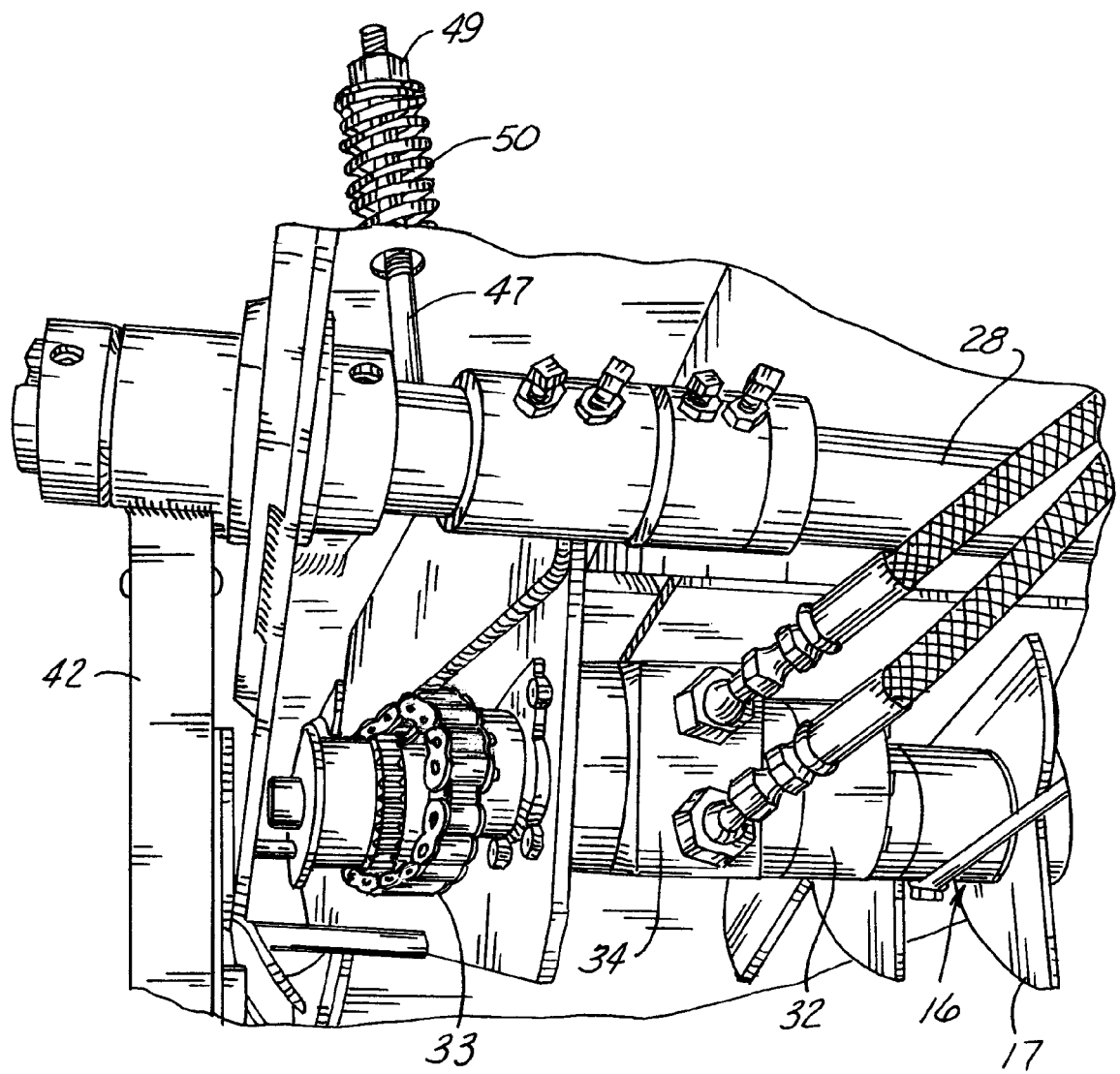
FIG. 12 is an enlarged perspective view of the certain components of the rotor and pickup from the right front side of the baler of the present invention.

FIG. 12 shows a drive chain and sprocket 33 for selectively rotating the drive shaft 18 and therefore the entire rotor 16, including the blade assemblies 17. This chain and sprocket 33 is ideally connected to and rotated with the drive mechanism, not shown, for the pickup 13. The chain and sprocket is turned by using hydraulic motor 34. Alternatively, the rotor can be rotated in either direction independently using hydraulic motor, such as hydraulic motor 34. Of course the drive shaft 18 could be powered using other sources of power, such as an electric motor, or something deriving its power from the power take off shaft of the towing tractor 11, for example.

Looking back to FIGS. 2 and 3, it is shown that the rotor 16 has a link arm 41 pivotally attached thereto. This link arm 41 is pivotally attached to another arm 42 at pin 28, which arm 42 is telescopingly adjustable in length with respect to arm 43, using a pin 44 placed in one or more of the openings 46 in arm 43. The pin 44 is confined to slot 45 in the baler but is slidable therein. An arm 47 extends through an opening in baler with a helical compression spring 50 disposed around it. The spring 50 abuts a washer/nut assembly 49 at the top of arm 47 and a washer 51 that is too big to go through the opening in baler part 10 shown in FIGS. 2 and 3. Arm 47 is pivotally attached to the arm 41 and thusly the arm 41 is urged upwardly by the spring 50. The arm 43 is pivotally attached to the pickup frame 15 at pivot point 49. The force of the spring 50 can be increased by screwing the nut 49 farther onto the rod 47, for example for heavier crops like cornstalks. The force of the spring 50 can be decreased by screwing the nut 49 farther out on the rod 47, such as for crops like straw.

FIG. 2 shows an operative position of the instant invention while picking up and baling crop material. In FIG. 2, a gauge wheel 52 is shown in dashed lines at an optimum setting for setting the pickup 13 so that the tines 13 pass very close to the ground to pick up a maximum amount of the crop material. In that setting, the effective length of arm 42/43 is set by placing a pin 44 through a specific one of the holes 46 in arm 43 through slot 45 in arm 42. But if it is desired to have the tines 14 not so close to the ground while baling, the pin 44 would be removed, the linkage of arm 42/43 shortened to a desired length and then the pin 44 placed in the lowest opening 46 in arm 43 within the slot 45 in arm 42. Then the gauge wheel 52 is adjusted by loosening part 53, moving part 53 and moving it downwardly in the slot 54, and tightening part 53 to keep the gauge wheel 52 set at that place in slot 54. That will raise the pickup 13 farther from the ground so that tines 14 are spaced farther from the ground than is shown in the operative position shown in FIG. 2.

Looking to FIG. 2 again, it is noted that a front wind guard 60 is bolted by bolt 61 to one of the cylindrical members 22 at the rear of the wind guard 60 and the front of the wind guard 60 is held up by flexible chain member 62 attached at the top to member 28 and at the bottom to cross member 64. The distance that the wind guard 60 will float downwardly is adjusted by how long the chain 62 is between the members 28 and 63. Accordingly, however, if a large amount of crop material passes under the wind guard 60 it can force the wind guard 60 upwardly, but no farther upwardly than the member 28.

U.S. Pat. Nos. 6,295,797 to Naaktgeboren, 6,810,650 to McClure and 6,962,041 to Taylor et al. and 4,495,756 to Greiner et al., all of which are incorporated herein by reference in their entirety, show forward and/or wind guards on large round balers. In general wind guards for a baler comprise a plurality of rods above a pickup section of a baler for preventing the wind from blowing the crop picked up by the baler pickup and furthermore to hold the crop materials picked up off the ground against the pickup so that the tines can move the crop material towards the baling chamber.

The front wind guard 60 is made up of a plurality of rods 60a attached at the back end thereof to respective ones of the cylindrical members and at the front thereof to member 63. The distance that the pickup tines 14 are adjusted with respect to the ground depends on where the crop is with respect to the ground. For example in a wheat stubble field, the straw could be above the ground a substantial distance, for example on top of plant stems (a stubble field) extending six to twelve inches above the ground. In contrast, in a hay field the hay is typically cut as close to the ground as possible so the gauge wheel would be close to the position shown in FIG. 2 for baling hay.

Figure 4:
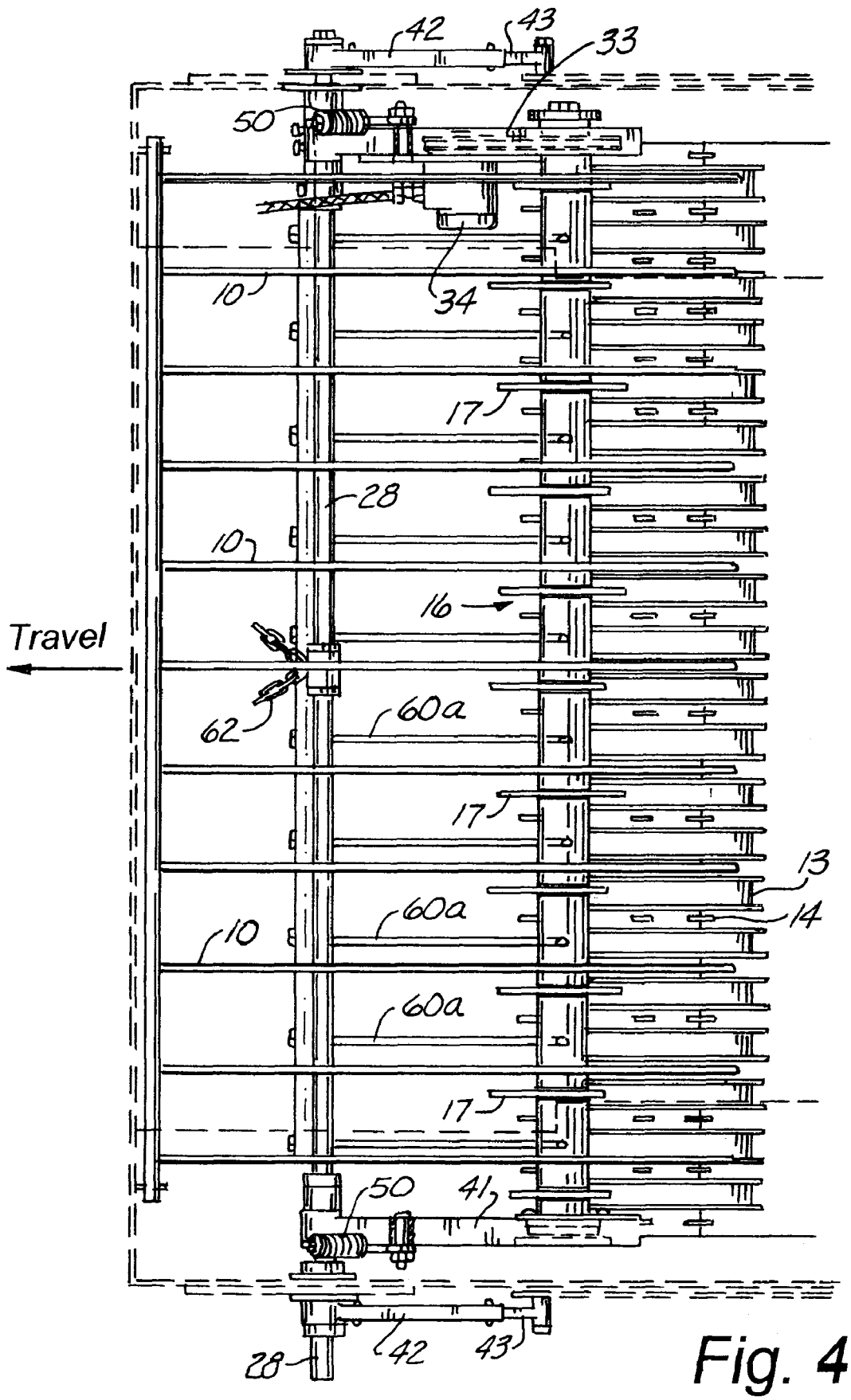
FIG. 4 is a top view of the rotor and pickup section of a baler having the present invention attached thereto.
Figure 5:
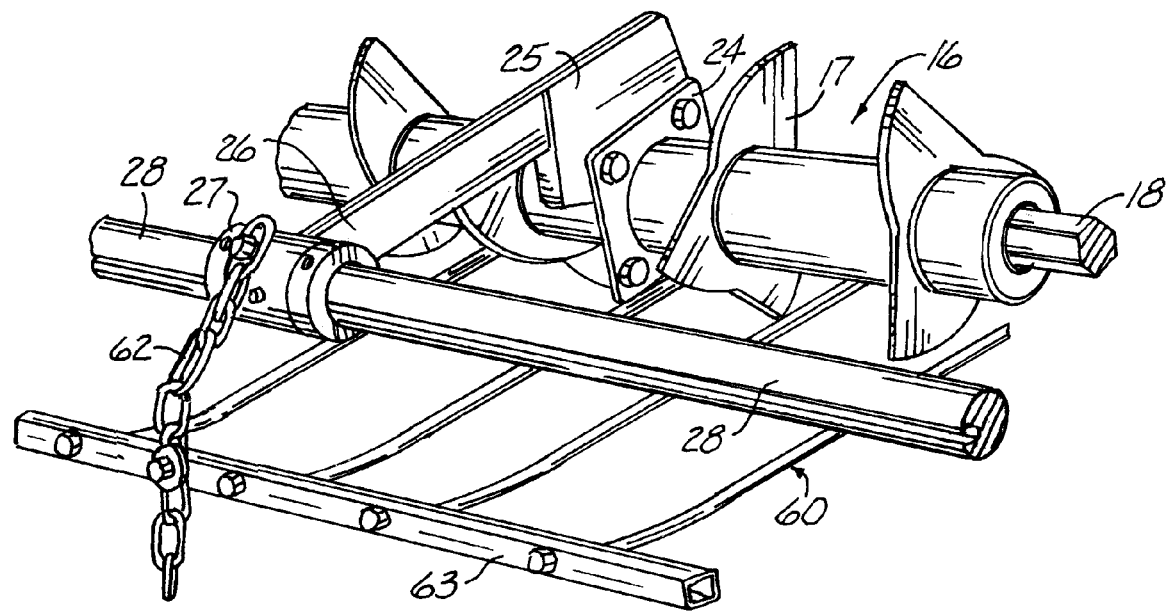
FIG. 5 is an enlarged perspective view of the powered rotor and forward wind guard of the present invention shown attached to a baler with a wide pickup.

Looking to FIG. 2 again, it is noted that a rear wind guard 40 is attached at the front thereof pivotally to the baler, rests on top of the rotor 16 and extends rearwardly from the rotor 16 above the pickup 13 to hold crop material down into the pickup 13. The rear wind guard 40 includes a plurality of rods 10 as can best be seen in FIG. 4.

In operation of the embodiment of FIGS. 1-12, the rotor would be disposed in the operative position as shown in FIGS. 1 and 2. The baler would be used as a normal baler but additionally the rotor 16 would be rotating in the direction of FIG. 2 at the same time that the pickup teeth are moving in the position shown in FIG. 2. This will cause the crop material to enter the space between the pickup 13 and the rotor 16 and be moved towards the baling chamber rearwardly of these two components. By having the powered rotor 16 in addition to the normal pickup 13, the crop material will not pile up in front of the pickup but will enter the baler positively and quickly as soon as the rotor blades 17 contact such material and force them towards the pickup and somewhat rearwardly. While there should never be a plug of crop material that would get stuck in the pickup of such a baler, if something like a branch from a tree were to get stuck, the rotor could be moved to the position shown in FIG. 3 and then back to the position shown in FIG. 2 which would most likely cause the obstruction to pass on into the baling chamber. The crop material will also be guided to the position between the rotor 16 and the pickup 13 by the wind guard 60, for example as shown in FIG. 1. Crop materials having a stiff stalk, like corn stalks, will be positively forced between the pickup 13 and rotor 16 and to some extent crimped, bent, and broken to cause better flow past the pickup 13.

While it is not a necessary feature of this invention, the rotor 16 can also be reversible, by reversing the direction of the hydraulic motor 34 so that unplugging of the pickup 13 of the baler could also be assisted by rotating the rotor 16 in the opposite direction as that shown by the arrow in FIG. 2.

Figure 13:
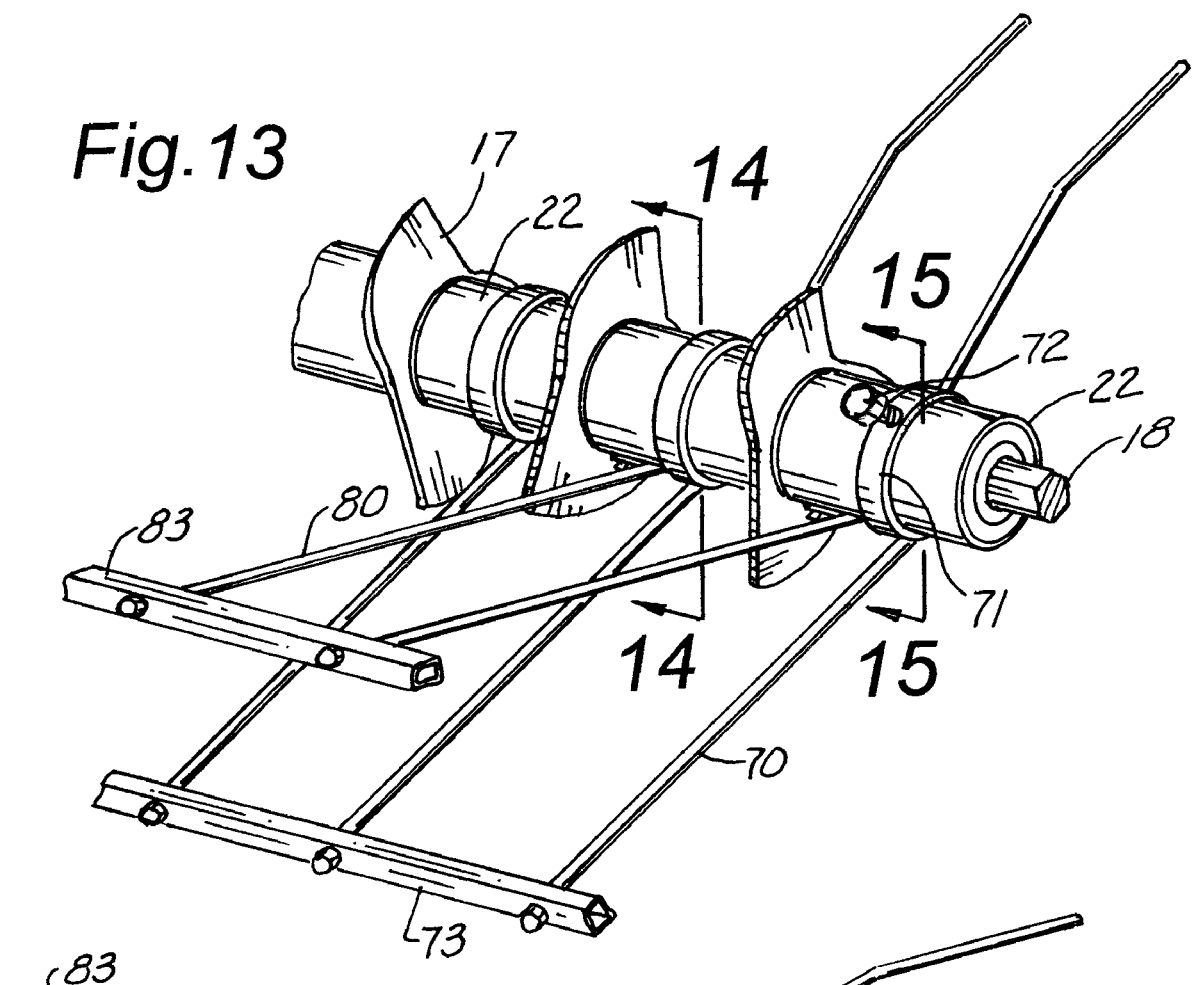
FIG. 13 is an enlarged perspective view of the powered rotor with a modified form of a forward wind guard and including a rear wind guard for attachment to the present invention instead of the one shown in FIGS. 1 and 5, for example.
Figure 14:
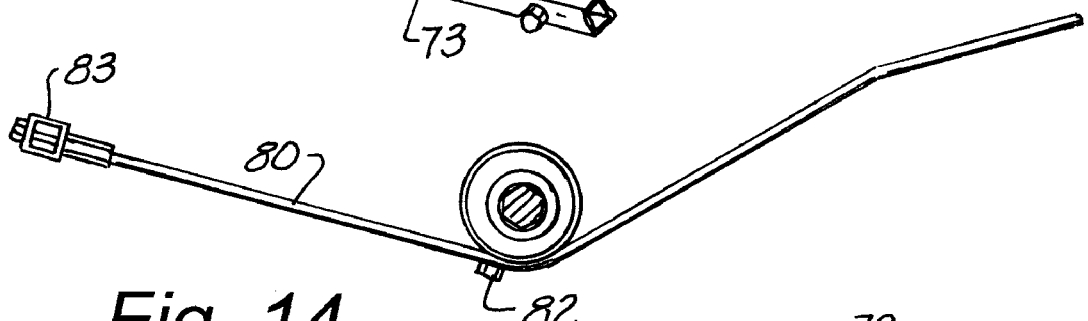
FIG. 14 is cross sectional view taken along line 14-14 of FIG. 13 showing how the rear wind guard is attached to the rotor.
Figure 15:
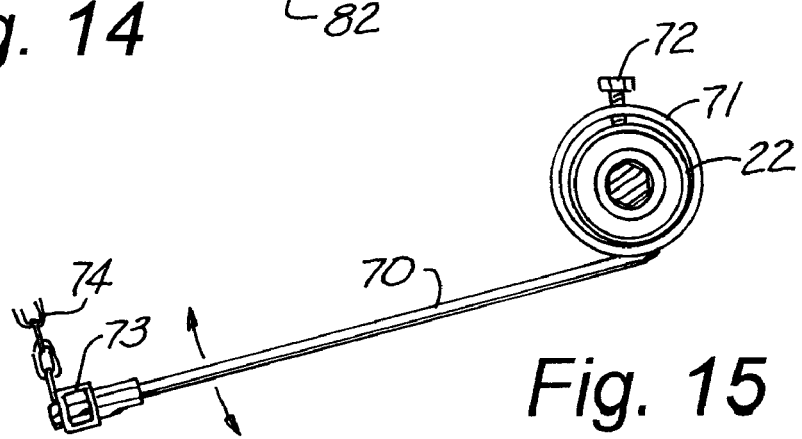
FIG. 15 is cross sectional view taken along line 15-15 of FIG. 13 showing how the front wind guard is attached to the rotor.

FIGS. 13, 14 and 15 show an alternate form of front and rear wind guard in which the front wind guard 70 is adjustable with respect to the rear wind guard 80. By slipping the ring 72 around the rotor part 22, the rear end of the front wind guard 70 is held up. A member 73 attaches all of the front wind guard rods 70 together. A chain 74 is attached to the member 73, which chain 74 is also attached to a portion of the baler above the chain 74. The distance that front wind guard will pivot downwardly is controlled by the length of the chain 74. Accordingly adjustments to the vertical elevation of the member 73 and thereby the front wind guard 70 can be made using the chain 74. Once adjusted to the position desired a set screw bolt 72 is tightened to secure the back end of the front wind guard 70. While each ring 71 could have a set screw bolt 72, one is only needed on each end of the front wind guard 70 because all of the rods 70 are tied together by the member 73.

FIGS. 13 and 14 show the rear wind guard 80. The rear wind guard is bolted to a cylindrical member 22 using bolt 82. The front part of the rear wind guard has a member 83 attaching all of the rods 80 together. Then member 83 can be secured to the baler so that between member 83 being attached to the baler and rods 80 being bolted to cylindrical members 22, the rear portions of the wind guard 80 are held in the position shown in FIG. 13 and the front wind guard can be adjusted with respect thereto as explained above. The crop material will pass first below the front wind guard 70 and then below the wind guard 80 as it passes between the pickup 13 and the rotor 16.

Obviously many modifications and variations of the present invention are possible in light of the above teachings. It is therefore to be understood that, within the scope of the appended claims, the invention may be practiced otherwise than as specifically described.

The invention claimed is:

1. An apparatus for baling a crop disposed on the ground in a field comprising:
    a baler having a pickup thereon for picking up crop materials from the ground and moving such crop materials towards a baling chamber;
    wherein the pickup comprises a pickup frame operatively attached to the baler, the pickup frame having a front and a rear and a plurality of laterally spaced apart tines which have a first position adjacent the ground below the pickup frame and a second position raised from the ground above the pickup frame whereby the pickup tines are powered to move between at least the first and second positions thereof;
    a powered rotor operatively rotationally attached to the baler about an axis of rotation which is disposed in at least a first position a predetermined distance above and forwardly of the rear of the pickup frame, the rotor being powered to rotate in at least one direction; and
    a plurality of blade assemblies operatively attached to the rotor and having blades extending radially outwardly from the axis wherein at least at times one or more of the blade assemblies are disposed between one or more of the tines whereby adjacent blades which are below the axis of rotation of the rotor can be selectively moved towards the baling chamber to assist the pickup tines to move the crop materials into the baling chamber when the rotor is powered in said at least one direction.

2. The apparatus of claim 1 wherein the rotor is reversible for assistance in clearing excess crop materials from the pickup.

3. The apparatus of claim 1 wherein the axis of rotation of the rotor is moveable between the first position and a second position, the second position thereof being spaced farther away from the pickup frame than in the first position thereof whereby movement of the rotor away from the pickup frame can cause excess crop material to be removed from the pickup.

4. The apparatus of claim 3 wherein the direction of rotation of the rotor is reversible for assistance in clearing excess crop materials from the pickup.

5. The apparatus of claim 1 further comprising a linkage operatively attached between the rotor and the pickup for controlling the distance between the first and second position of the axis of the rotor with respect to the pickup frame.

6. The apparatus of claim 5 wherein the linkage comprises:
    a first arm pivotally attached to the rotor about the rotational axis of the rotor;
    a second arm operatively pivotally attached to the pickup frame;
    a member in the baler having a slot therein;
    a pin disposed in the slot; and
    the first and second arms being operatively pivotally attached to the pin.

7. The apparatus of claim 6 wherein the first arm is biased upwardly.

8. The apparatus of claim 6 wherein the second arm is adjustable in an amount of bias thereon.

9. The apparatus of claim 8 wherein a gauge wheel is operatively attached to the pickup and the gauge wheel has a plurality of selectable vertical positions with respect to the pickup frame for adjusting the distance of the pickup frame from the ground.

10. The apparatus of claim 1 including a first plurality of rods disposed between respective ones of the blade assemblies and extending forwardly from the rotor for directing the crop material to be urged downwardly toward the pickup frame and pickup tines.

11. The apparatus of claim 10 including a second plurality of rods disposed between respective ones of the blade assemblies and extending rearwardly from the rotor towards the baling chamber for directing the crop material to be urged downwardly toward the pickup frame for facilitating movement of the crop material from the pickup frame towards the baling chamber.

12. The apparatus of claim 10 wherein the first plurality of rods are pivotally adjustable substantially about the rotational axis of the rotor.

13. The apparatus of claim 12 wherein the first plurality of rods are connected together at the front ends thereof and a flexible member is operatively attached to at least one of the rods and to a portion of the baler above such one of the rods whereby the distance that the first plurality of rod can move downwardly can be adjusted while permitting the rods to move upwardly in response to crop material gathering under the first plurality of rods, thereby forming a wind guard.

14. The apparatus of claim 13 wherein the flexible member is a chain.

15. The apparatus of claim 1 wherein the rotor comprises:
    a first blade having a non-circular opening in a center portion thereof, at least two projections extending radially outwardly from the center portion thereof;
    a second blade having a non-circular opening in a center portion thereof, at least two projections extending radially outwardly from the center portion thereof; and
    a non-circular in cross-section drive shaft extending through the non-circular opening in the first and second blade assemblies whereby rotation of the drive shaft causes rotation of the first and second blade assemblies in the same direction as rotation of the drive shaft.

16. The apparatus of claim 15 wherein the rotor comprises a subassembly comprising:
   a first bearing disposed around and in contact with the driveshaft at a place between the first and second blade assemblies, the first bearing having an inside diameter and an outside diameter, the first bearing having an inner race and an outer race, the inner race having an outside diameter;
   a second bearing disposed around and in contact with the driveshaft at a place between the first and second blade assemblies, the second bearing having an inside diameter and an outside diameter, the second bearing having an inner race and an outer race, the inner race having an outside diameter;
   a spacer disposed between the first and second bearings;
   a cylindrical housing having a predetermined inside diameter disposed around and in a press fit relationship with the first and second bearings and with the spacer, between the first and second blade assemblies;
   a first washer having an outside diameter less than the outside diameter of the inner race of the first bearing being disposed around the shaft in contact with the inner race of the first bearing;
   a second washer having an outside diameter less than the outside diameter inner race of the second bearing being disposed around the shaft on another side of the second bearing and in contact with the inner race of the second bearing;
   a third washer having an outside diameter of less than the outside diameter of the first bearing, the third washer being disposed between the first washer and the first blade;
   a fourth washer having an outside diameter of less than the outside diameter of the bearing, the fourth washer being disposed between the second washer and the second blade; and
   wherein the first blade, second blade and driveshaft will rotate inside the cylindrical housing while the cylindrical housing remains fixed with respect to the baler.

17. The apparatus of claim 16 wherein the rotor further comprises:
   a plurality of other substantially identical subassemblies on the driveshaft to form a rotor extending substantially all of the way across the pickup frame and whereby respective blade assemblies of the rotor will extend between respective teeth of the pickup.

18. The apparatus of claim 1 wherein the rotor is selectively moveable between an operating position close to the pickup frame and a plug clearing position spaced farther from the pickup frame.

19. The apparatus of claim 18 wherein the rotor is selectively rotatable in the at least one direction when in an operating position close to the pickup frame and is rotatable in a direction opposite to said first direction when in a plug clearing position.

20. The apparatus of claim 1 wherein each respective one of the blade assemblies comprise at least three spaced apart blades.

21. The apparatus of claim 20 wherein each blade has a leading edge and a trailing edge when the respective blade assembly is rotating in said at least one direction and wherein the leading edge is curved so that portions of the leading edge are more forward than other parts of the leading edge during such rotation and thereby permitting the crop material to be more gently urged forwardly than if a straight leading edge was used.

22. The apparatus of claim 21 wherein the trailing edge is straight so that when the direction of rotation of the rotor is reversed to a plug clearing direction, the blades will more aggressively move the crop material in a direction away from the baling chamber.

23. The apparatus of claim 1 wherein the rotor is mounted in a floating relationship with respect to the pickup frame so that when more crop material enters the pickup area, the rotor can float upwardly and when less crop material is disposed between the pickup and the rotor the rotor will move downwardly due at least partially to gravitational forces.

24. The apparatus of claim 1 wherein adjacent blade assemblies are staggered so that blades on adjacent blade assemblies contact the crop materials in a stepped fashion.

25. The apparatus of claim 1 wherein adjacent tines of the pickup have a respective blade assembly between them.

26. The apparatus of claim 17 including a plurality of rods disposed between respective ones of the blade assemblies and extending forwardly from the rotor for directing the crop material to be urged downwardly toward the pickup frame and pickup tines; and
   wherein the subassemblies of the rotor interact with the plurality of rods to prevent the crop material from wrapping around the rotor.

27. The apparatus of claim 17 including a first plurality of rods disposed between respective ones of the blade assemblies and extending forwardly from the rotor for directing the crop material to be urged downwardly toward the pickup frame and pickup tines;
   a second plurality of rods disposed between respective ones of the blade assemblies and extending rearwardly from the rotor towards the baling chamber for directing the crop material to be urged downwardly toward the pickup frame for facilitating movement of the crop material from the pickup frame towards the baling chamber; and
   wherein the subassemblies of the rotor interact with the first and second plurality of rods to prevent the crop material from wrapping around the rotor.

28. The apparatus of claim 8 wherein the bias includes an adjustable spring suspension system for adjusting between light and heavy crops.

29. A method of baling a crop with a baler having a pickup frame with moving tines thereon, the pickup frame having a front and a rear, a baling chamber and a power rotor rotatable about a rotational axis which is above and forwardly of the rear of the pickup frame, the power rotor having blades thereon, the method comprising:
   towing a baler through a field having crop materials on the ground therein;
   using the baler pickup to pick up the crop materials from the ground by causing the tines thereof to move between a position near the ground to a position closer to the baling chamber;
   rotating the rotor about its rotational axis in a direction to cause the blades of the rotor to move towards the baling chamber when such blades are below a rotational axis of the rotor;
   causing blades of the rotor to be disposed between tines of the pickup to lessen slippage of the crop material with respect to the pickup;
   baling the crop using the baler to form a bale; and
   ejecting the bale from the baler after the bale has reached a desired configuration.

30. The method of claim 29 wherein the rotor is initially disposed a predetermined distance from the pickup; and changing the predetermined distance to encourage the plug of excess crop material to be dislodged from the area between the pickup and the rotor as the rotor is moved away from or closer to the pickup.

31. The method of claim 29 including reversing the direction of the rotor if a plug of crop material that is too large enters an area between the pickup and the rotor.

32. An apparatus for baling a crop disposed on the ground in a field comprising:

a baler having a baler frame and having a pickup thereon for picking up crop materials from the ground and moving such crop materials towards a baling chamber;

wherein the pickup comprises a pickup frame operatively attached to the baler, the pickup frame having a front and a rear and a plurality of laterally spaced apart tines which have a first position adjacent the ground below the pickup frame and a second position raised from the ground above the pickup frame whereby the pickup tines are powered to move between at least the first and second positions thereof;

a powered rotor operatively rotationally attached to the baler about an axis of rotation which is disposed in at least a first position a predetermined distance above and forwardly of the rear of the pickup frame, the rotor being powered to rotate in at least one direction;

a plurality of blade assemblies operatively attached to the rotor and having blades extending radially outwardly from the axis wherein at least at times one or more of the blade assemblies are disposed between one or more of the tines whereby adjacent blades which are below the axis of rotation of the rotor can be selectively moved towards the baling chamber to assist the pickup tines to move the crop materials into the baling chamber when the rotor is powered in said at least one direction a linkage pivotally attached to the pickup frame along a pickup frame axis; and the linkage being operatively pivotally attached to the baler frame along a baler frame axis, the baler frame axis being spaced from the pickup frame axis.

33. The apparatus of claim 32 wherein the baler frame axis is not fixed with respect to the baler frame.

34. The apparatus of claim 1 further comprising a linkage operatively attached between the rotor and the pickup for automatically controlling the distance between the first and second position of the axis of the rotor with respect to the pickup frame without changing any length of the linkage.

35. The apparatus of claim 1 further comprising linkage means operatively attached between the rotor and the pickup for automatically controlling the distance between the first and second position of the axis of the rotor with respect to the pickup frame without changing any length of the linkage.

* * * * *